(12) United States Patent
Holzbaur et al.

(10) Patent No.: US 7,779,791 B2
(45) Date of Patent: Aug. 24, 2010

(54) CIRCUIT ARRANGEMENT FOR THE COOLING OF CHARGE AIR AND METHOD FOR OPERATION OF SUCH A CIRCUIT ARRANGEMENT

(75) Inventors: Thomas Holzbaur, Stuttgart (DE); Rolf Müller, Ludwigsburg (DE); Eberhard Pantow, Möglingen (DE); Sarah Parmentier, Gerlingen (DE); Eike Willers, Stuttgart (DE)

(73) Assignees: Behr GmbH & Co. KG, Stuttgart (DE); Behr Thermot-Tronik GmbH, Kornwestheim ( * ) Notice: Subject to any disclaimer, the term of this patent is extended or adjusted under 35 U.S.C. 154(b) by 0 days.

(21) Appl. No.: 10/583,352

(22) PCT Filed: Dec. 15, 2004

(86) PCT No.: PCT/EP2004/014249

§ 371 (c)(1),
(2), (4) Date: Apr. 20, 2007

(87) PCT Pub. No.: WO2005/061869

PCT Pub. Date: Jul. 7, 2005

(65) Prior Publication Data

US 2007/0186912 A1    Aug. 16, 2007

(30) Foreign Application Priority Data

Dec. 19, 2003  (DE) ................. 103 60 400

(51) Int. Cl.
*F01P 1/10* (2006.01)
*F01P 3/00* (2006.01)
(52) U.S. Cl. .............. 123/41.31; 123/41.29; 123/41.33

(58) Field of Classification Search ............. 123/563, 123/41.29, 41.05, 41.1, 41.31, 41.33, 568.11, 123/568.12; 60/602, 599; 165/299; 236/35, 236/35.3; 192/82 T; *F01P 1/10, 3/00*
See application file for complete search history.

(56) References Cited

U.S. PATENT DOCUMENTS

| 4,176,630 | A | * | 12/1979 | Elmer | 123/41.12 |
|---|---|---|---|---|---|
| 4,317,439 | A | * | 3/1982 | Emmerling | 123/563 |
| 4,325,219 | A | | 4/1982 | Stang et al. | |
| 4,485,624 | A | * | 12/1984 | Melchior | 60/599 |
| 4,893,589 | A | * | 1/1990 | Spinnler | 123/41.31 |
| 5,215,044 | A | * | 6/1993 | Banzhaf et al. | 123/41.29 |
| 5,353,757 | A | * | 10/1994 | Susa et al. | 123/41.29 |
| 6,679,431 | B1 | * | 1/2004 | Mathew et al. | 236/34.5 |
| 2003/0015183 | A1 | | 1/2003 | Sealy et al. | |

(Continued)

FOREIGN PATENT DOCUMENTS

CN    2453147 Y    10/2001

(Continued)

*Primary Examiner*—Stephen K Cronin
*Assistant Examiner*—Keith Coleman
(74) *Attorney, Agent, or Firm*—Foley & Lardner LLP (57) ABSTRACT

The invention relates to a circuit arrangement (K), with a low-temperature coolant circuit (1) for the cooling of charge air on a motor vehicle with a charging device, comprising a charge air/coolant cooler (2). A temperature sensor (4) is provided at the exit of the coolant from the charge air/coolant (2), or directly thereafter, for the measurement of the coolant exit temperature. The invention further relates to a method for operation of such a circuit arrangement (K).

15 Claims, 7 Drawing Sheets

U.S. PATENT DOCUMENTS

2003/0221638 A1    12/2003    Haase

FOREIGN PATENT DOCUMENTS

| DE | 199 02 504 A1 | 8/2003 |
| DE | 102 15 262 A1 | 10/2003 |
| EP | 0 584 850 A1 | 3/1994 |
| FR | 2 800 125 A1 | 4/2001 |
| GB | 2 038 939 A | 7/1980 |
| JP | 04-071743 U | 8/1992 |
| JP | 06-221165 A | 8/1994 |

* cited by examiner

CIRCUIT ARRANGEMENT FOR THE COOLING OF CHARGE AIR AND METHOD FOR OPERATION OF SUCH A CIRCUIT ARRANGEMENT

The invention relates to a circuit arrangement for cooling charge air, in a motor vehicle having a supercharger and to a method for operating such a circuit arrangement.

According to the prior art, in order to increase the performance of engines, superchargers are used to increase the air flow rate in the engine. During the compression which is required for this purpose, the air (denoted as charge air in the following) is however warmed on account of the compression in the supercharger. Air coolers which are arranged at the front of the cooling module and serve to cool the charge air are used to compensate for the compression losses which are associated with the warming of the charge air, that is to say to increase the air density. Here, the charge air flows through a heat exchanger, through which ambient air flows and which is therefore cooled by said ambient air. As a result, it is possible for the charge air to be cooled to a temperature which, at full engine power, is approximately 15 K above the ambient air temperature.

Figure 8:
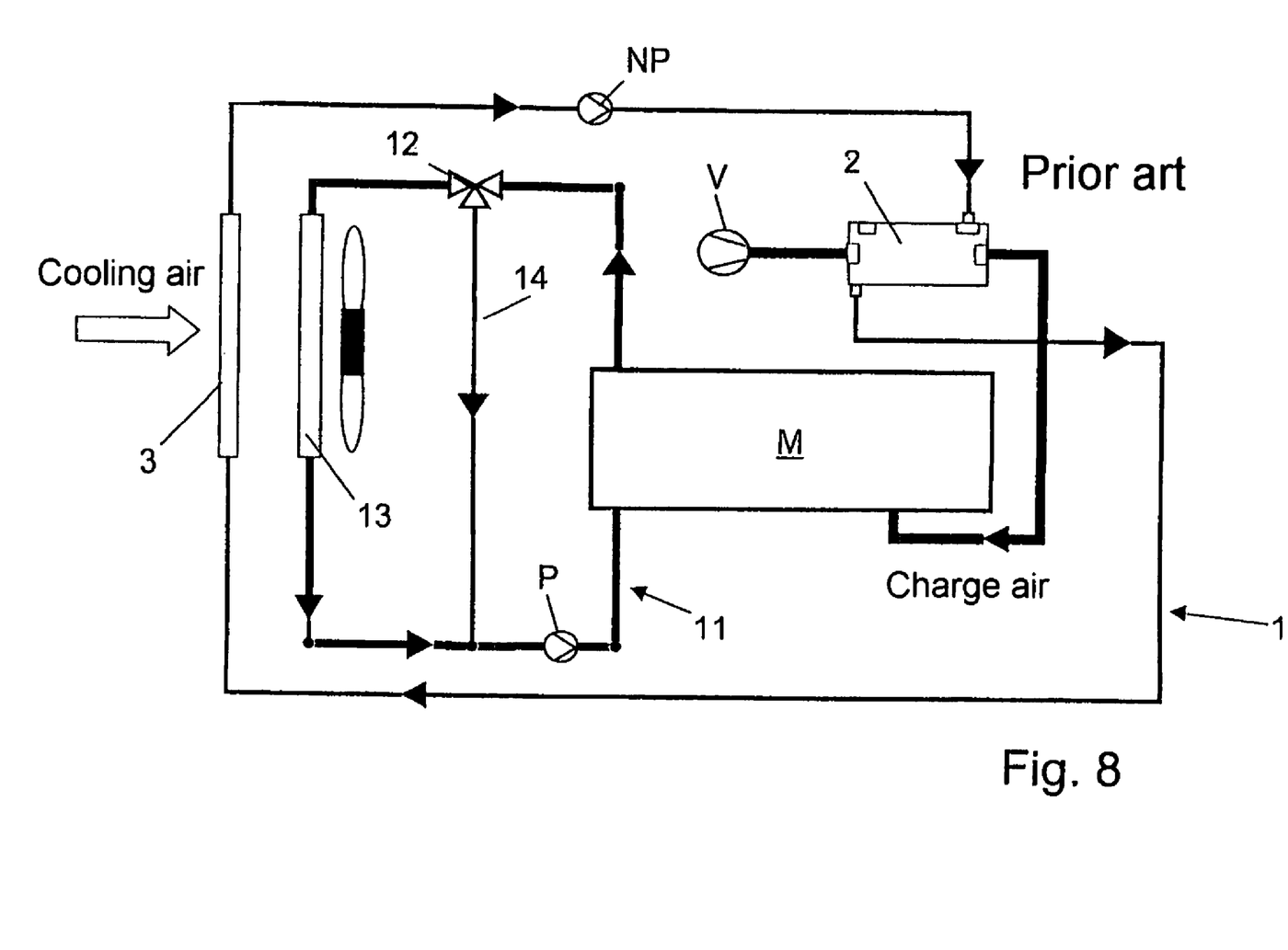
FIG. 8 shows a circuit arrangement according to the prior art.

It is also known for the charge air to be cooled by means of a coolant circuit, for example a low temperature coolant circuit, in which the coolant is cooled down to very low temperatures. The charge air in a charge-air/coolant radiator is cooled down to a predefined cooling temperature by said cold coolant. There are two variants for the connection of the low temperature coolant circuit, specifically an integration of the low temperature coolant circuit into an ancillary circuit of the engine cooling system or a configuration in the form of a separate coolant circuit. FIG. 8 illustrates a known low temperature coolant circuit 1 for indirect charge air cooling. The charge air traveling from the compressor of the supercharger V is cooled in a charge-air/coolant radiator 2 and is subsequently fed to the engine M. A low temperature coolant circuit pump NP circulates the coolant in the low temperature coolant circuit 1. Here, the coolant passes from the pump NP to the charge-air/coolant radiator 2, in which the coolant cools the charge air, to a low temperature coolant radiator 3. A main coolant circuit 11 is provided in addition to the low temperature coolant circuit 1. The coolant of the main coolant circuit 11 is circulated by means of a pump P and passes from the pump P to the engine M. Depending on its temperature, the coolant is guided, in a manner controlled by means of a thermostat 12, to the main radiator 13 and back to the pump P, or directly to the pump P via a bypass 14 past the main radiator 13. In a temperature transition range, the coolant flow is divided at the thermostat 12 into a partial flow to the main radiator 13 and a partial flow via the bypass 14.

Such a circuit arrangement leaves something to be desired.

It is an object of the invention to improve a circuit arrangement of the type mentioned in the introduction.

According to the invention, a circuit arrangement having a low temperature coolant circuit for cooling charge air in a motor vehicle having a supercharger with a charge-air/coolant radiator is provided, a temperature sensor being provided at the coolant outlet of the charge-air/coolant radiator or a short distance downstream for measuring the coolant outlet temperature. This makes it possible to control the coolant flow rate as a function of the coolant outlet temperature of the coolant from the charge-air/coolant radiator. Here, the sensor can be integrated into the outlet from the charge-air/coolant radiator or else be arranged a short distance downstream of the charge-air/coolant radiator, it being desired for the distance from the charge-air/coolant radiator to be as small as possible in order to ensure optimum and in particular fast control.

The temperature can be directly detected by means of a temperature sensor which is embodied as a thermostat, wherein no separate control valve or other device for controlling the coolant volume flow rate is required as a result of this embodiment. If a simple temperature sensor is provided, the coolant volume flow rate is controlled on the basis of the measured value by means of a control valve or another device for controlling the coolant volume flow rate. Here, the control valve or the like can be arranged upstream of a low temperature coolant radiator and upstream of the charge-air/coolant radiator. Alternatively, it can also be arranged downstream of the temperature sensor.

The temperature sensor is preferably integrated into a plastic part, in particular a plastic injection-molded part, which serves to carry coolant.

The low temperature coolant circuit is preferably connected to a main coolant circuit, so that there is an exchange of coolant between the two coolant circuits.

The invention is explained in detail in the following on the basis of two exemplary embodiments and with reference to the drawing, in which.

Figure 1:
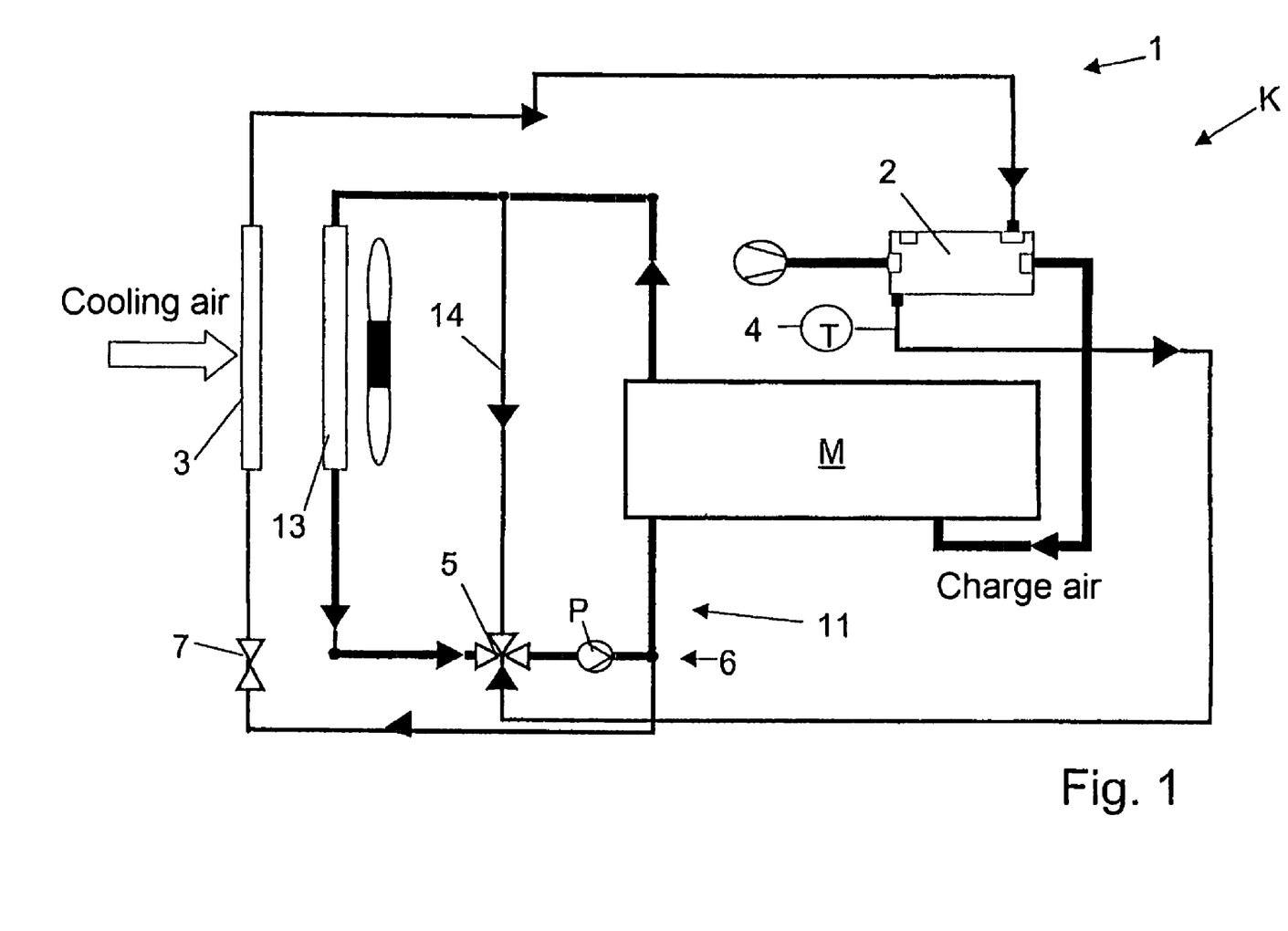
FIG. 1 shows a circuit arrangement according to the first exemplary embodiment.

FIG. 1 shows a circuit arrangement K which serves for charge air cooling and for engine cooling. Here, a low temperature coolant circuit 1 is coupled to a main coolant circuit 11. A charge-air/coolant radiator 2, and a sensor 4 arranged directly downstream of the latter, are arranged in that part of the circuit arrangement K which serves for charge air cooling. The coolant passes via a thermostat 5 to a pump P. A branching section 6 is provided downstream of said pump P, the part which leads to the engine M being explained in more detail at a later stage. Downstream of the branching section 6, the coolant travels via a control valve 7 to the low temperature coolant radiator 3 and, in turn, to the charge-air/coolant radiator 2, in which the compressed charge air is cooled. Downstream of the branching section 6, the remaining coolant is fed to the engine M. Depending on its temperature, the coolant is guided entirely through a main coolant radiator 13 or a bypass 14 and back to the thermostat 5, or it is divided into partial flows through the main coolant radiator 13 and the bypass 14.

To optimize the indirect charge air cooling, the coolant flow rate in the low temperature coolant circuit is controlled.

Figure 6:
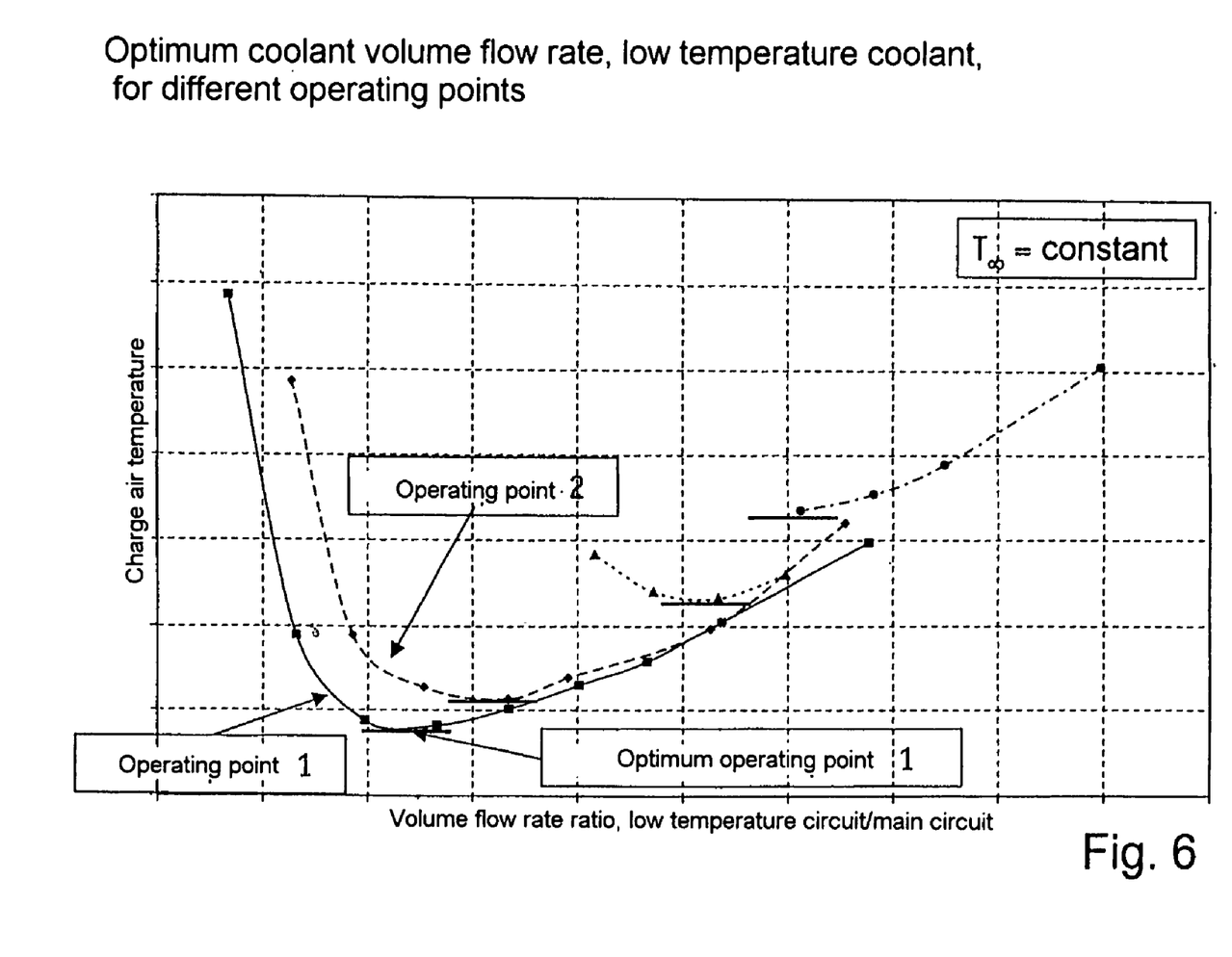
FIG. 6 shows a diagram illustrating the optimization of the coolant volume flow rate of the low temperature coolant radiator for different operating points, the temperature of the charge air being plotted against the volume flow rate ratio of the low temperature coolant circuit in relation to that of the main coolant circuit.

Here, the optimum coolant outlet temperature from the charge-air/coolant radiator 2 is virtually independent of the outside temperature. The relationship illustrated in FIG. 6 is therefore valid over a wide ambient temperature range. In order to be able to react quickly to load changes, the temperature sensor 4 is arranged as close as possible to the coolant outlet of the charge-air/coolant radiator 2. The coolant flow rate is controlled in a manner known per se by means of the measured values detected by the sensor 4.

Figure 3:
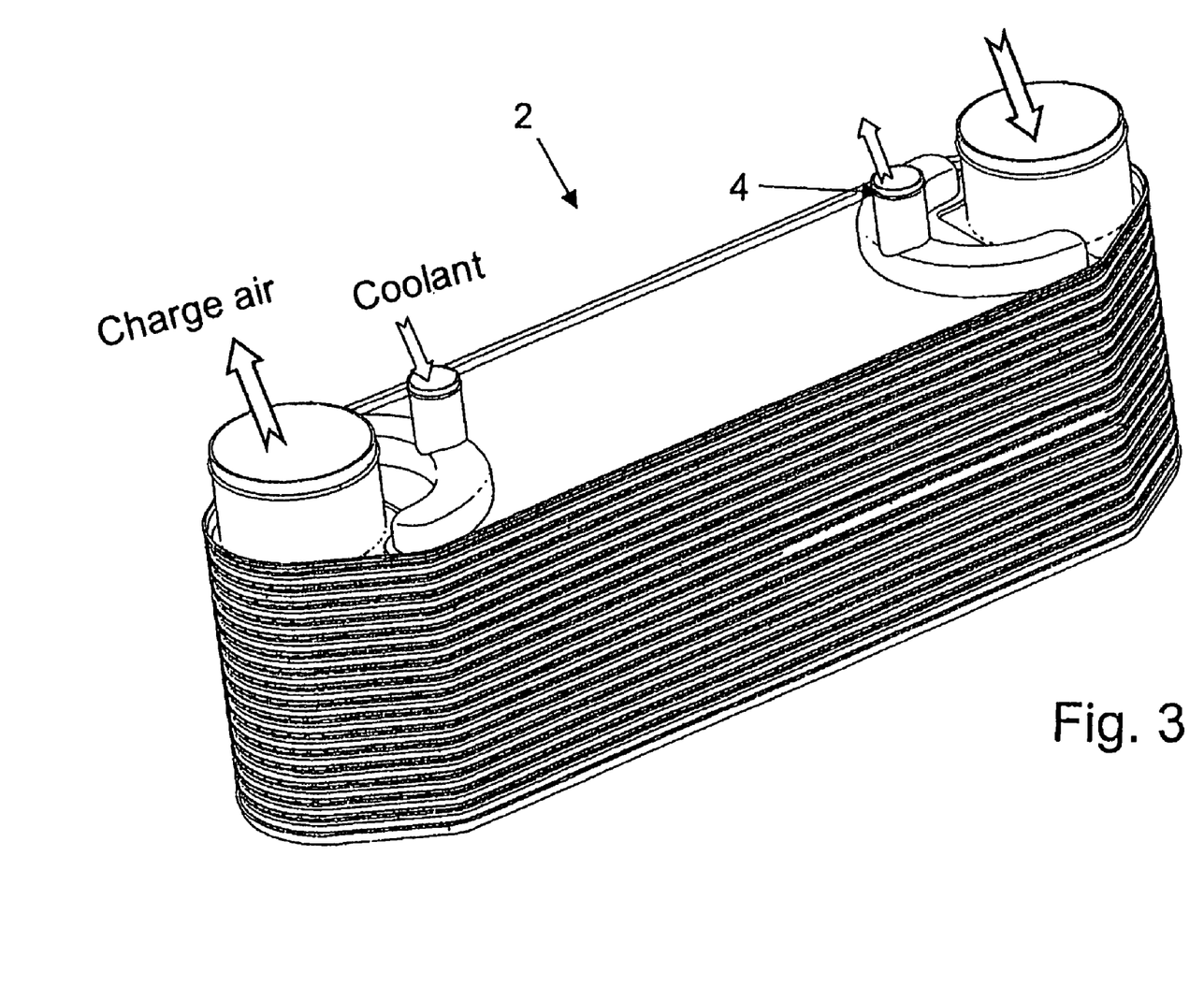
FIG. 3 shows a perspective view of a charge-air/coolant radiator.

According to the present exemplary embodiment, the sensor 4 is integrated into the coolant outlet of the charge-air/coolant radiator 2, as can be seen in FIG. 3. According to the first exemplary embodiment, the sensor 4, on account of the problems in integrating it into a metal heat exchanger, is integrated into an injection-molded plastic part which simultaneously serves for the distribution of the coolant.

Figure 2:
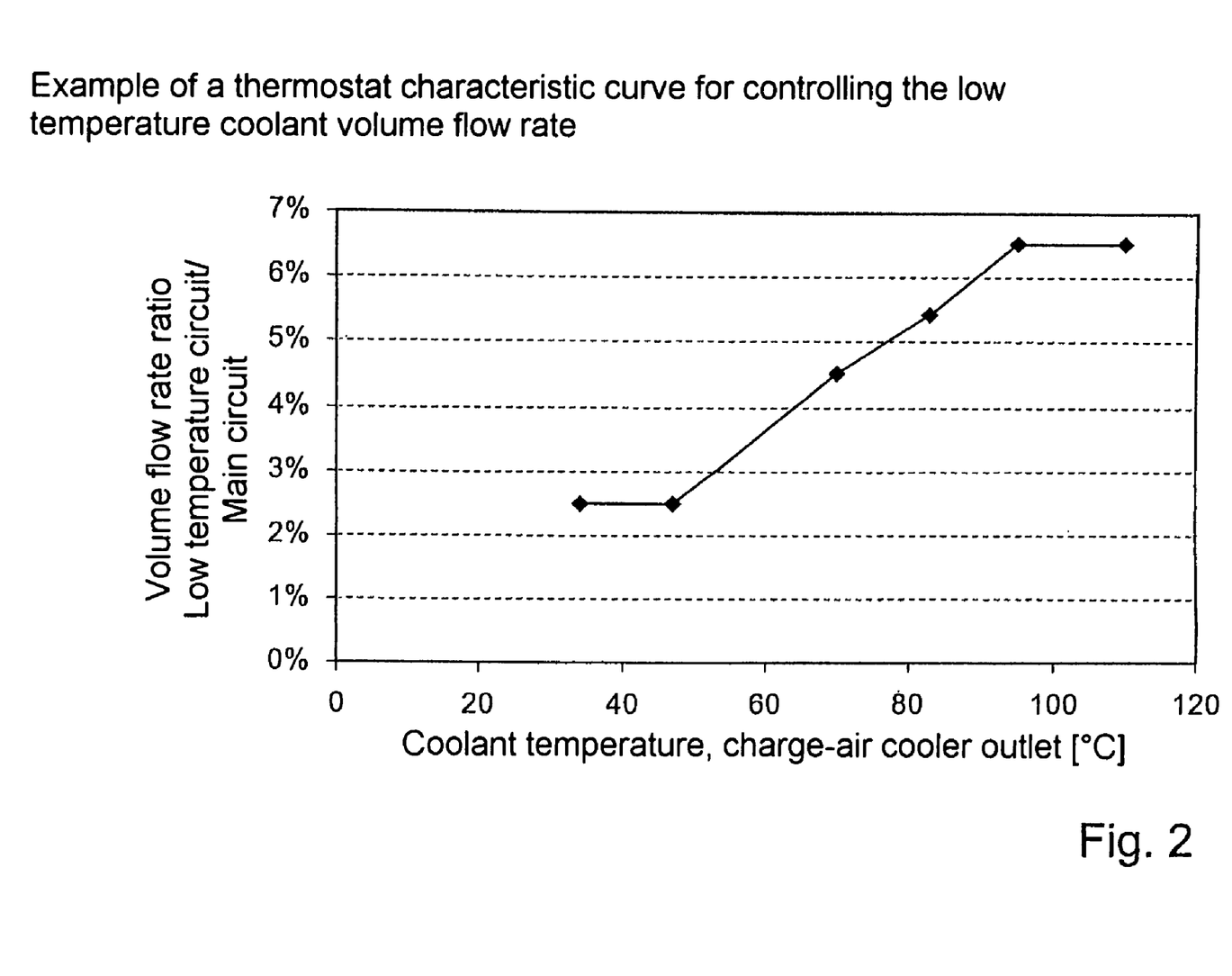
FIG. 2 shows a thermostat characteristic curve for controlling the low temperature coolant volume flow rate, with the volume flow rate ratio of the low temperature coolant circuit in relation to that of the main coolant circuit plotted against the coolant temperature at the outlet of the charge-air/coolant radiator.
Figure 4:
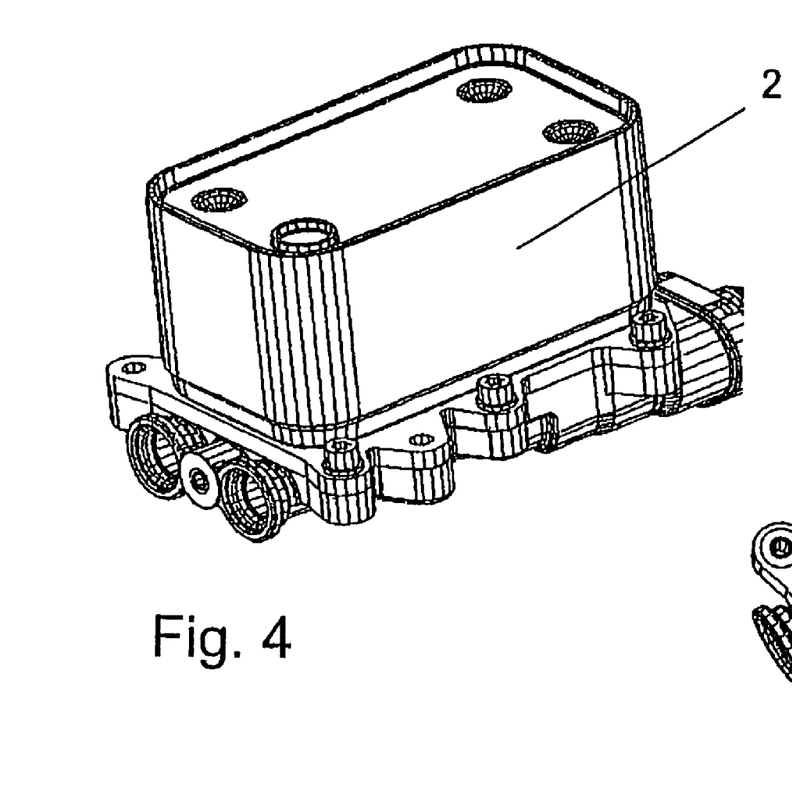
FIG. 4 shows a perspective view of a variant of the arrangement of a sensor.
Figure 5:
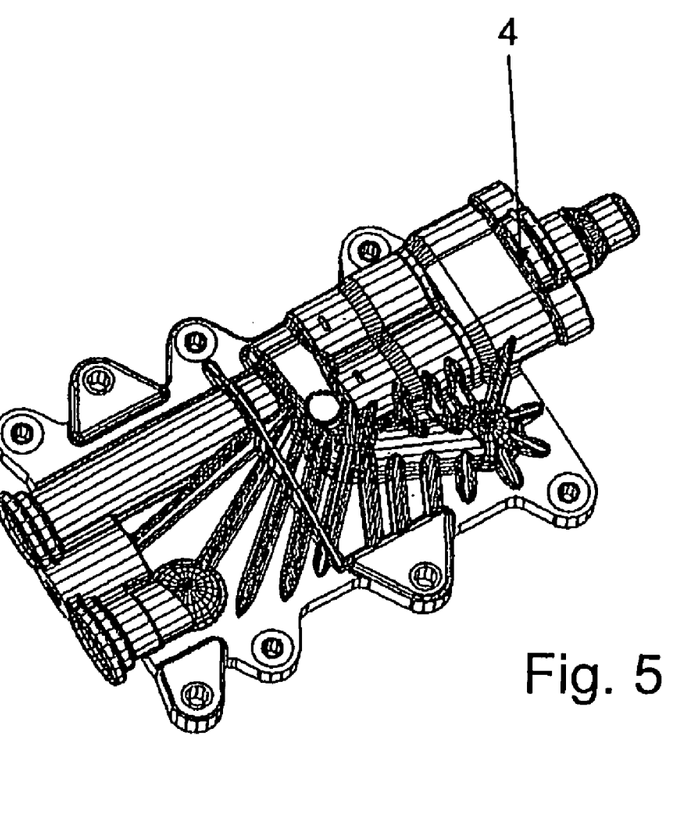
FIG. 5 shows a view of FIG. 4 from below.

One variant of the arrangement of the sensor 4 in the charge-air/coolant radiator 2 is illustrated in FIGS. 4 and 5. Here, the temperature sensor 4 is formed by a thermostat which has an expanding element as an actuator. Here, the thermostat has a minimum flow rate (leakage), which is necessary in order to ensure that the information regarding the temperature of the coolant in the event of a sudden step in load reaches the actuator quickly and is sufficient for charge air cooling in the part-load range. The maximum flow rate is specified such that local boiling of the coolant, in particular in the charge-air/coolant radiator 2 or downstream thereof, is avoided at full load. The beginning and end of opening conform to the temperature level required for the optimum control of flow rate (cf. thermostat characteristic curve illustrated in FIG. 2). The range between leakage flow rate and maximum flow rate is defined such that the thermostat starts to open when the coolant at the outlet of the charge-air/coolant radiator 2 is in the temperature range between 40° C. and 60° C., and the thermostat reaches its fully open state when the coolant temperature at the measuring point is between 90° C. and 110° C. Here, when the thermostat is fully open, the coolant flow rate is two to four times as large as the leakage set in the closed state of the thermostat. According to the present exemplary embodiment, the profile of the coolant volume flow rate increase is linear but can also run in a progressive, degressive or discontinuous fashion.

According to the first exemplary embodiment, control is carried out—in contrast to the direct control by means of the thermostat—by means of the control valve 7 as a function of the coolant temperature detected by the temperature sensor 4, said control valve 7 being arranged upstream of the low temperature coolant radiator 3 in the low temperature coolant circuit 1.

Figure 7:
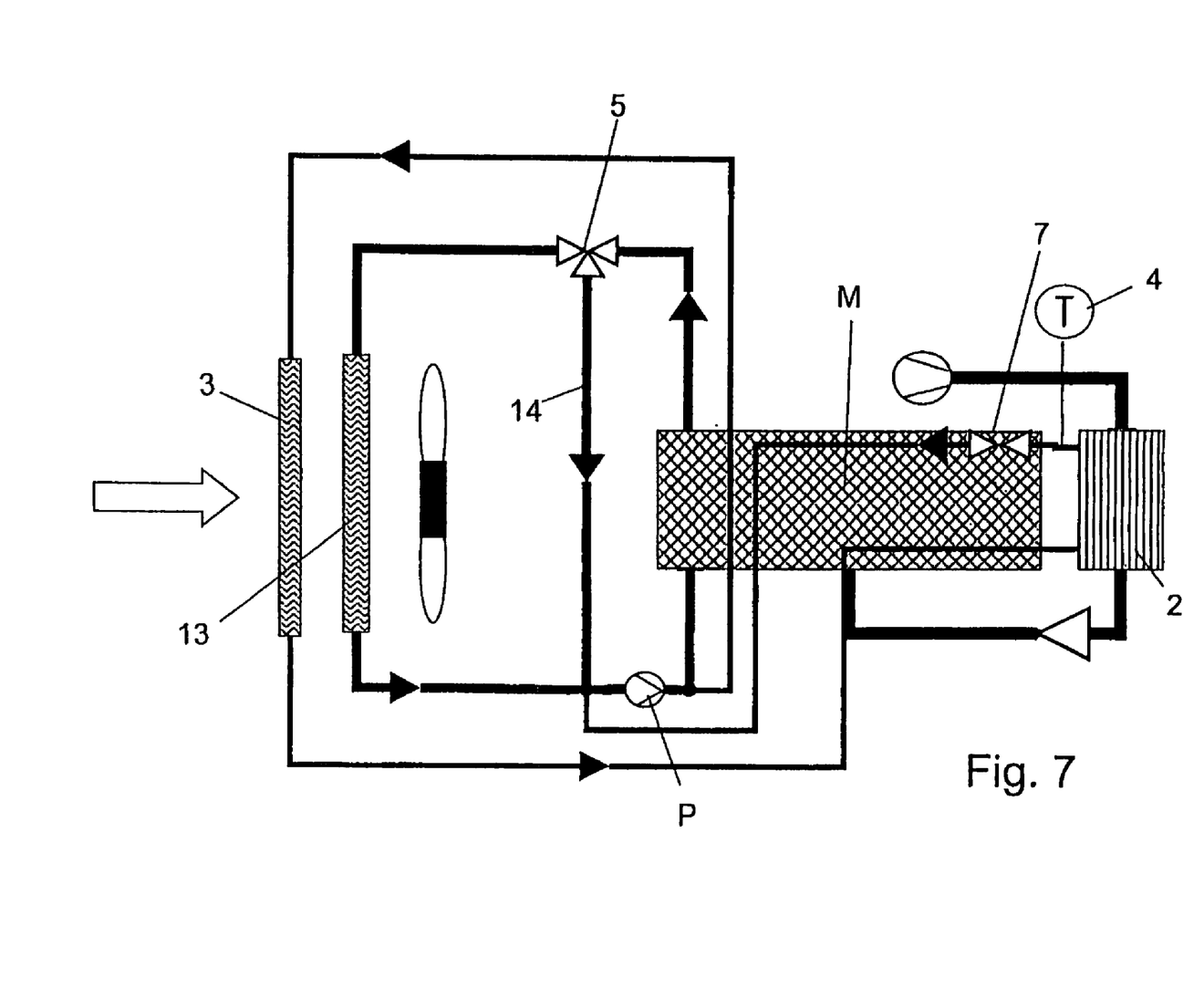
FIG. 7 shows a circuit arrangement according to the second exemplary embodiment.

FIG. 7 shows a circuit arrangement K according to the second exemplary embodiment. Here, the control valve is arranged downstream of the temperature sensor 4. The circuit arrangement K of the second exemplary embodiment otherwise substantially corresponds to that of the first exemplary embodiment, that is to say with the exception of the arrangement of the thermostat 5 at the branching section of the bypass in the main coolant circuit and not at the return line of the bypass into the main coolant circuit.

The coolant flow rate through the charge-air/coolant radiator is controlled in particular by means of an electrical actuating element and/or by heating the temperature sensor, in particular the thermostat.

The coolant flow rate through the charge-air/coolant radiator is preferably controlled taking into consideration a rotational speed and/or load, in particular of a drive engine of the motor vehicle, a traveling speed of the motor vehicle, an outside temperature and/or an ambient pressure.

LIST OF REFERENCE SYMBOLS

1 Low temperature coolant circuit
2 Charge-air/coolant radiator
3 Low temperature coolant radiator
4 Sensor
5 Thermostat
6 Branching section
7 Control valve
11 Main coolant circuit
13 Main coolant radiator
14 Bypass
K Circuit arrangement
M Engine
NP Low temperature coolant circuit pump
P Pump

The invention claimed is:

1. A circuit arrangement, comprising:
    a low temperature coolant circuit configured to cool charge air in a motor vehicle having a supercharger,
    a main coolant circuit in addition to the low temperature coolant circuit, wherein the main coolant circuit is configured to provide coolant to an engine,
    wherein the main coolant circuit and the low temperature coolant circuit are connected so that there is an exchange of coolant between the main coolant circuit and the low temperature coolant circuit,
    a single-unit, integrated charge-air and coolant radiator, wherein the low temperature coolant circuit comprises a coolant passage configured to cool the single-unit, integrated charge-air and coolant radiator with coolant flowing through the passage, and
    a temperature sensor provided at a coolant outlet of the radiator, wherein the temperature sensor is located at the coolant outlet prior to any branches in a coolant passage extending from the coolant outlet, wherein the temperature sensor is configured to measure a coolant outlet temperature.

2. The circuit arrangement as claimed in claim 1, wherein a coolant flow rate is controlled as a function of the determined coolant temperature.

3. The circuit arrangement as claimed in claim 1, wherein the temperature sensor is a thermostat.

4. The circuit arrangement as claimed in claim 1, wherein the temperature sensor is integrated into a plastic part which serves to carry coolant.

5. The circuit arrangement as claimed in claim 4, wherein the plastic part is produced by means of plastic injection-molding.

6. The circuit arrangement as claimed in claim 1, wherein a control valve is arranged in the low temperature coolant circuit.

7. The circuit arrangement as claimed in claim 6, wherein the control valve is arranged upstream of a low temperature coolant radiator or upstream of the charge-air and coolant radiator.

8. The circuit arrangement as claimed in claim 1, wherein the coolant traveling from the charge-air and coolant radiator is fed upstream of a pump to the main coolant circuit.

9. A method for operating a circuit arrangement, comprising:
    circulating coolant through a low temperature circuit configured to cool charge air in a motor vehicle having a supercharger, circulating coolant for an engine of the motor vehicle through a second circuit, wherein the second circuit is provided in addition to the low temperature coolant circuit, wherein the second circuit and the low temperature coolant circuit are connected so that there is an exchange of coolant between the second circuit and the low temperature coolant circuit, providing a single-unit, integrated charge-air and coolant radiator, wherein the coolant circuit comprises a coolant passage configured to cool the single-unit, integrated charge-air and coolant radiator with coolant flowing through the passage, determining the temperature of coolant at an outlet of the radiator, wherein the temperature is determined at the coolant outlet at a location prior to any branches in a coolant passage extending from the coolant outlet, and controlling a coolant flow rate through the radiator.

10. The method as claimed in claim 9, wherein the coolant flow rate through the radiator is controlled taking into consideration a rotational speed and/or load.

11. The circuit arrangement as claimed in claim 1, wherein the temperature sensor is integrated with the coolant outlet of the radiator.

12. The circuit arrangement as claimed in claim 1, further comprising a low temperature coolant radiator configured to cool coolant supplied to the single-unit, integrated charge-air and coolant radiator.

13. The method as claimed in claim 9, wherein the step of determining the temperature of the coolant at the outlet of the radiator is performed by using a sensor integrated with the coolant outlet of the radiator.

14. The method as claimed in claim 9, wherein the step of circulating coolant through the low temperature circuit comprises circulating the coolant through a low temperature coolant radiator configured to cool the coolant supplied to the single-unit, integrated charge-air and coolant radiator.

15. The method as claimed in claim 10, wherein the coolant flow rate through the radiator is controlled taking into consideration a rotational speed and/or load of a drive engine of the motor vehicle, a traveling speed of the motor vehicle, an outside temperature and/or an ambient pressure.

* * * * *